Patented Jan. 13, 1925.

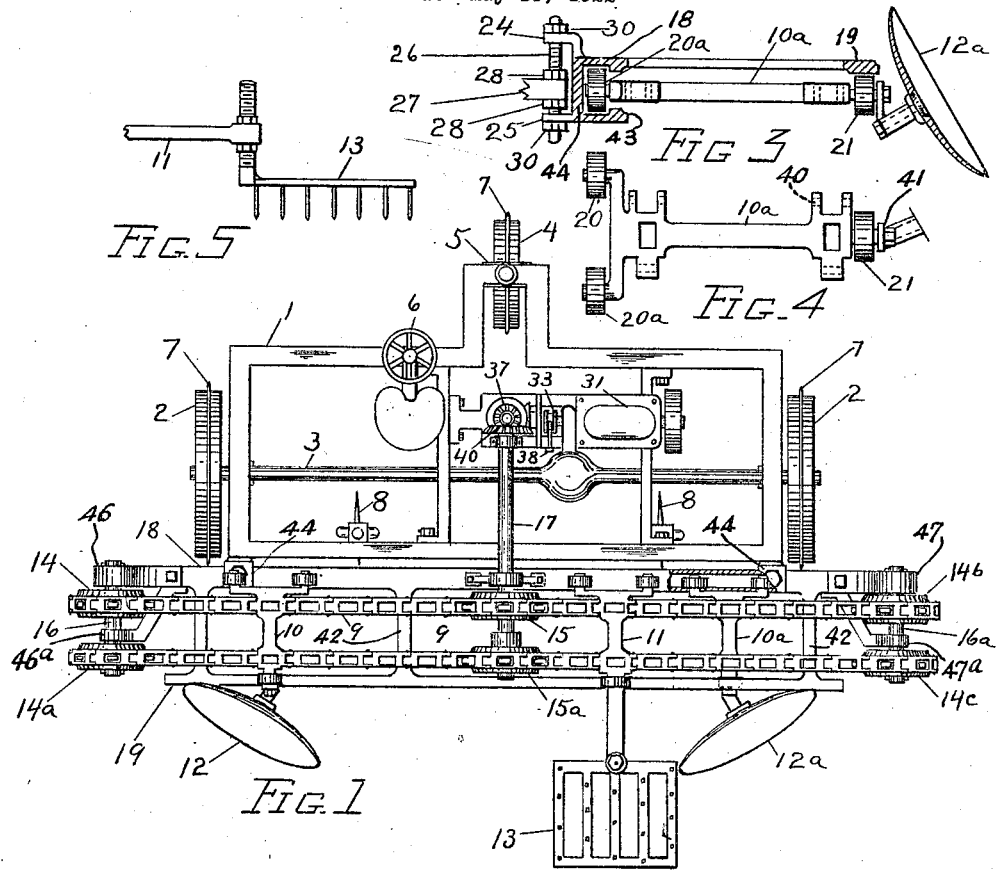

1,522,800

UNITED STATES PATENT OFFICE.

OLIVER S. BOWMAN, OF COLORADO SPRINGS, COLORADO.

FARM IMPLEMENT.

Application filed May 13, 1922. Serial No. 560,763.

*To all whom it may concern:*

Be it known that I, OLIVER S. BOWMAN, a citizen of the United States, and a resident of Colorado Springs, in the county of El Paso and State of Colorado, have invented a new and useful Farm Implement, of which the following is a specification.

My invention relates to mechanically-propelled plowing, pulverizing and leveling implements.

The object of my invention is to provide an implement with which to plow, pulverize and level by direct application of power, at a single operation. (At present a number of implements are employed, usually operated separately, by mechanical or animal traction.)

This application shows the preferred embodiment of my invention, but I do not limit myself to the precise form herein disclosed, wishing it understood that, within the scope of the claims following, various changes may be made.

My invention consists of a plowing, pulverizing and leveling implement, comprising a plurality of discs and a pulverizer suitably disposed on a conveyor operatively mounted transversely on a mobile truck, both conveyor and truck deriving their power from one motor.

Fig. 1 represents a plan view; Fig. 2, a rear elevation, (showing the standards and two sprockets partly broken away); Fig. 3, a sectional elevation of a disc-supporting member (with a disc mounted thereon): Fig. 4, a plan view of the same member; and Fig. 5, an elevation of the pulverizer, mounted on a fragment of the stem of the forked link bar 11. Figs. 3, 4 and 5 are drawn to an enlarged scale.

The truck comprises frame 1, having wheels 2 mounted on axles within casing 3, (which also encloses a differential) and wheel 4, mounted in a fork 5 rotatably mounted in frame 1 and connected to the shaft of steering wheel 6. Wheels 2 and 4 have circular blades 7 on the periphery thereof adapted to prevent any side slip incident to the transverse movement of the discs 12, 12$^a$ and pulverizer 13. Blades 7, together with rolling cutters 8, are also adapted to cut stalks, straw etc.

Parallel bars 18 and 19 connected by cross supports 42 and a third bar 43 disposed below parallel with and connected to bar 18 by vertical supports 44 having lugs 24 and 25 thereon, are mounted on threaded posts in extensions 27 on frame 1 and held secure thereon by nuts 30. By raising or lowering nuts 28, bars 18, 19 and 43 are vertically adjusted. A standard 45 is mounted midway, and two pairs of bearings 46—46$^a$ and 47—47$^a$ are mounted on the ends of bar 18. Shaft 17, carrying a pair of sprocket wheels 15—15$^a$ is journaled in standard 45; shaft 16, carrying a pair of sprocket wheels 14—14$^a$ and shaft 16$^a$, carrying a pair of sprocket wheels 14$^b$—14$^c$, are journaled in bearings 46—46$^a$ and 47—47$^a$ respectively, the axes of said pairs of sprocket wheels occupying the vertices of a triangle. A plurality of sprocket chains 9 disposed in pairs and connected longitudinally and transversely by forked link bars 10, 10$^a$ and 11 each having three axles supporting rollers 20, 20$^a$ and 21, is mounted on said pairs of sprocket wheels. The stem of link bar 11 is extended to form a support for pulverizer 13 which is adjustably mounted thereon. Skewed axles 41 are mounted on link bars 10 and 10$^a$ and discs 12 and 12$^a$ are mounted on said skewed axles.

Bars 18, 19 and 43 maintain said forked link bars in a horizontal position, when co-operating therewith. The discs and pulverizer travel in a triangular course located equally distant thereon to permit the returning disc to pass the cutting disc. There is a period during which disc 12, 12$^a$ and pulverizer 13 are simultaneously out of the ground, when the conveyor may be stopped by throwing bevel gear 35 out of mesh by means of lever 38 and clutch 33 (when the truck may be turned at the end of the field or driven from place to place). The movement of the truck and the motion of the conveyor (transversely of the truck) are so co-ordinated that, during the interval required for one disc to make a complete cut, the truck moves forward a distance equal to the width of said cut. Pulverizer 13, located midway between discs 12 and 12$^a$, has sufficient width to pulverize the ground turned over by both discs. Motor 31, geared to the differential within casing 3, is adapted to propel the truck on which it is mounted and also to drive the mechanism actuating the conveyor, the transmission of power being by means of crank-shaft 32, clutch 33 (integral with bevel gear 35), shaft 36, bevel gears 37, 39 and 40 and horizontal shaft 17 having driving sprockets 15 and 15ᵃ mounted thereon.

I claim:

1. In an implement of the class described, a frame, comprising parallel bars connected by cross supports and a third bar disposed below, parallel with, and connected to one of said parallel bars by vertical supports having lugs thereon adapted to be adjustably mounted on threaded posts; for the purposes set forth.

2. In an implement of the class described, a forked link bar, comprising a stem, a plurality of axles adapted to support rollers and two sprocket chain links, adapted to connect and become integral with two pairs of sprocket chains and to support a pulverizer; for the purposes set forth.

3. In an implement of the class described, a forked link bar, comprising a plurality of axles adapted to support rollers and two sprocket chain links adapted to connect and become integral with two pairs of sprocket chains and to support skewed axles, for the purposes set forth.

4. In an implement of the class described, including in combination, a plurality of sprocket chains disposed in pairs and connected longitudinally and transversely by a plurality of forked link bars, adapted to be mounted on sprocket wheels, for the purposes set forth.

5. In an implement of the class described, including in combination, a forked tool bar comprising a stem, a plurality of axles supporting rollers and two sprocket chain links, adapted to connect and become integral with two pairs of sprocket chains, and a soil treating tool carried on the stem of said forked tool bar; for the purposes set forth.

6. In an implement of the class described, including in combination, a forked tool bar, comprising a plurality of axles supporting rollers and two sprocket chain links adapted to connect and become integral with two pairs of sprocket chains, and a skewed axle, adapted to carry a soil treating tool, mounted on said tool bar; for the purposes set forth.

7. In an implement of the class described, including in combination, a forked tool bar, comprising a plurality of axles supporting rollers and two sprocket chain links adapted to connect and become integral with two pairs of sprocket chains; a skewed axle mounted on said tool bar, and a soil treating tool mounted on said skewed axle; for the purposes set forth.

8. In an implement of the class described, including in combination parallel bars connected by cross supports and a third bar disposed below, parallel with and connected to one of said parallel bars by vertical supports adapted to be adjustably mounted on a truck; a standard, mounted midway on one of said parallel bars; a shaft, journaled in said standard adapted to be actuated by a mechanism on said truck; a pair of bearings, mounted on each end of one parallel bar; a shaft journaled in each pair of said bearings, and a pair of sprocket wheels, mounted on each of said shafts, the axes of said pairs of sprocket wheels occupying the vertices of a triangle; for the purposes set forth.

9. In an implement of the class described, including in combination, parallel bars connected by cross supports and a third bar disposed below, parallel with and connected to one of said parallel bars by vertical supports having lugs thereon adapted to be mounted adjustably on a truck; a standard, mounted midway on one of said parallel bars; a shaft, journaled in said standard adapted to be actuated by a mechanism on said truck; a pair of bearings, mounted on each end of one parallel bar; a shaft journaled in each pair of said bearings; a pair of sprocket wheels, mounted on each of said shafts, the axes of said pairs of sprocket wheels ocupying the vertices of a triangle, and a plurality of sprocket chains disposed in pairs and connected longitudinally and transversely by a plurality of forked link bars, mounted on said pairs of sprocket wheels; for the purposes set forth.

10. In an implement of the class described, including in combination, parallel bars connected by cross supports and a third bar disposed below, parallel with and connected to one of said parallel bars by vertical supports having lugs thereon adapted to be adjustably mounted on a truck; a standard, mounted midway on one of said parallel bars; a shaft, journaled in said standard adapted to be actuated by a mechanism on said truck; a pair of bearings, mounted on each end of one parallel bar; a shaft, journaled in each pair of said bearings; a pair of sprocket wheels, mounted on each of said shafts, the axes of said pairs of sprocket wheels occupying the vertices of a triangle; a plurality of sprocket chains, disposed in pairs and connected longitudinally and transversely by a plurality of forked link bars, mounted on said pairs of sprocket wheels, and a soil treating tool, mounted adjustably on one of said forked link bars; for the purposes set forth.

11. In an implement of the class described, including in combination, parallel bars connected by cross supports and a third bar disposed below, parallel with and connected to one of said parallel bars by vertical supports having lugs thereon adapted to be mounted adjustably on a truck; a standard, mounted midway on one of said parallel bars; a shaft, journaled in said standard adapted to be actuated by a mechanism on said truck; a pair of bearings, mounted on each end of one parallel bar; a shaft, journaled in each pair of said bearings; a pair of sprocket wheels, mounted on each of said shafts, the axes of said pairs of sprocket wheels occupying the vertices of a triangle; a plurality of sprocket chains disposed in pairs and connected longitudinally and transversely by a plurality of forked link bars, mounted on said pairs of sprocket wheels; a soil treating tool mounted adjustably on one of said forked link bars, and a skewed axle, adapted to carry a soil treating tool mounted on each remaining forked link bar; for the purposes set forth.

12. In an implement of the class described, including in combination, parallel bars connected by cross supports and a third bar disposed below, parallel with and connected to one of said parallel bars by vertical supports having lugs thereon adapted to be adjustably mounted on a truck; a standard, mounted midway on one of said parallel bars; a shaft, journaled in said standard adapted to be actuated by a mechanism on said truck; a pair of bearings, mounted on each end of one parallel bar; a shaft, journaled in each pair of said bearings; a pair of sprocket wheels, mounted on each of said shafts, the axes of said pairs of sprocket wheels occupying the vertices of a triangle; a plurality of sprocket chains disposed in pairs and connected longitudinally and transversely by a plurality of forked link bars, mounted on said pairs of sprocket wheels; a soil treating tool mounted on one of said forked link bars; a skewed axle mounted on each remaining forked link bar; and a soil treating tool mounted on each of said skewed axles; for the purposes set forth.

OLIVER S. BOWMAN.